(12) United States Patent
Shomler

(10) Patent No.: US 6,567,853 B2
(45) Date of Patent: May 20, 2003

(54) SCALABLE I/O SYSTEM FOR THE EFFICIENT TRANSFER OF STORAGE DEVICE DATA BY A NON-SERVER RECONNECTION

(75) Inventor: Robert Wesley Shomler, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/986,755

(22) Filed: Dec. 8, 1997

(65) Prior Publication Data

US 2002/0062383 A1 May 23, 2002

(51) Int. Cl.$^7$ .............................................. G06F 15/16
(52) U.S. Cl. ...................... 709/229; 709/219; 709/225; 709/227; 707/10; 713/201
(58) Field of Search ................................ 709/203, 212, 709/216, 217, 219, 229, 227, 228, 239, 202, 218, 225; 710/62, 63, 64; 713/201, 161, 172, 160, 185, 200, 156, 157; 707/10, 1, 9

(56) References Cited

U.S. PATENT DOCUMENTS

| | | | |
|---|---|---|---|
| 4,649,473 A | | 3/1987 | Hammer et al. ............ 709/213 |
| 5,204,954 A | * | 4/1993 | Hammer et al. ............... 710/22 |
| 5,212,784 A | * | 5/1993 | Sparks ........................... 714/6 |
| 5,404,527 A | | 4/1995 | Irwin et al. ................... 709/222 |
| 5,566,331 A | * | 10/1996 | Irwin, Jr. et al. ............. 707/10 |
| 5,584,042 A | | 12/1996 | Cormier et al. ............... 710/36 |
| 5,590,334 A | | 12/1996 | Saulpaugh et al. ......... 709/303 |
| 5,613,124 A | * | 3/1997 | Atkinson et al. ........... 345/433 |
| 5,613,155 A | | 3/1997 | Baldiga et al. ................ 710/5 |
| 5,694,615 A | * | 12/1997 | Thapar et al. .................. 710/2 |
| 5,793,965 A | * | 8/1998 | Vanderbilt et al. .......... 709/203 |
| 5,835,724 A | * | 11/1998 | Smith .......................... 709/227 |
| 5,838,916 A | * | 11/1998 | Domenikos et al. ........ 709/219 |
| 5,857,188 A | * | 1/1999 | Douglas .......................... 707/9 |
| 5,862,339 A | * | 1/1999 | Bonnaure et al. ........... 709/227 |

(List continued on next page.)

OTHER PUBLICATIONS

Gnutella/cNapster Comparison, "Gnutella & Napster. HUH? or What do I need to know to keep from looking like ant idiot", http://www.gnutellanews.com/information/comparison.shtml.*

The Ohaha System, "Smart Decentralized Peer to Peer Sharing, Taking Gnutella, Freenet to the Next Level", http://ohaha.com/design.html.*

Object Management Group, Portable Interceptors RFO, Sep. 1998.*

Dossick et al., WWW Access to Leagacy Client/Server Applications, May 1996.*

Primary Examiner—Mehmet B. Geckil
Assistant Examiner—William C. Vaughn, Jr.
(74) Attorney, Agent, or Firm—Sawyer Law Group LLP

(57) ABSTRACT

A method and system for a scalable I/O system are presented. The scalable I/O system includes a server, at least one client, and at least one storage device. The server interfaces with the at least one client and at least one storage device. The at least one storage device and at least one client also interface for data transfer. The server initiates data transfer from the storage device on behalf of an open client. The server further sets up a disconnect state in the at least one storage device to be reconnected for transfer to a non-server interface. The server further passes information to the open client that is requesting data transfer, which allows the open client to determine dimensions of data transfer, number of storage devices that require accessing for the data transfer, and the relationship of the data transfer of each storage device to the original data request sent to the server.

27 Claims, 2 Drawing Sheets

U.S. PATENT DOCUMENTS

| | | | |
|---|---|---|---|
| 5,867,661 A | * | 2/1999 | Bittinger et al. ............. 709/227 |
| 5,893,116 A | * | 4/1999 | Simmonds et al. ......... 709/201 |
| 5,893,918 A | * | 4/1999 | Beardsley et al. .......... 711/112 |
| 5,903,733 A | * | 5/1999 | Hong ......................... 709/232 |
| 5,905,872 A | * | 5/1999 | DeSimone et al. ......... 709/245 |
| 5,915,093 A | * | 6/1999 | Berlin et al. ................ 709/219 |
| 5,940,841 A | * | 8/1999 | Schmuck et al. ........... 707/205 |
| 5,996,014 A | * | 11/1999 | Uchihori et al. ............ 709/214 |
| 6,003,084 A | * | 12/1999 | Green et al. ................ 709/227 |
| 6,006,268 A | * | 12/1999 | Coile et al. ................. 709/227 |
| 6,014,702 A | * | 1/2000 | King et al. ................. 709/227 |
| 6,023,698 A | * | 2/2000 | Lavey, Jr. et al. ............ 707/10 |
| 6,029,175 A | * | 2/2000 | Chow et al. ................... 707/10 |
| 6,032,224 A | * | 2/2000 | Blumenau .................... 710/15 |
| 6,088,451 A | * | 7/2000 | He et al. ..................... 380/255 |
| 6,092,196 A | * | 7/2000 | Reiche ........................ 705/52 |
| 6,108,703 A | * | 8/2000 | Leighton et al. ............ 709/226 |
| 6,192,408 B1 | * | 2/2001 | Vahalia et al. .............. 709/217 |
| 6,240,417 B1 | * | 5/2001 | Eastwick et al. ............... 707/1 |
| 6,247,055 B1 | * | 6/2001 | Cotner et al. ............... 709/227 |
| 6,247,139 B1 | * | 6/2001 | Walker et al. ................. 714/2 |
| 6,275,953 B1 | * | 8/2001 | Vahalia et al. ................ 714/11 |
| 6,298,380 B1 | * | 10/2001 | Coile et al. ................. 709/203 |

\* cited by examiner

SCALABLE I/O SYSTEM FOR THE EFFICIENT TRANSFER OF STORAGE DEVICE DATA BY A NON-SERVER RECONNECTION

FIELD OF THE INVENTION

The present invention relates generally to data transfer in an input/output (I/O) system, and more particularly to data transfers that utilize non-server reconnections from storage devices.

BACKGROUND OF THE INVENTION

Current computing environments typically comprise computer networks. Whether locally connected, or connected via a remote link, such as through a dial-in modem link, computer systems normally communicate via a server device. These computer systems, i.e., clients, require performance of various services, while the server device, i.e., servers, are the hardware/software network components that perform these services. Included among these services are electronic mail, file transfers, and remote database access applications. Moving data between computers and between processes can result in a large amount of computing overhead for servers, especially when data is moved to different locations in a server's local storage, such as onto a storage device.

Typically, a server masks the appearances of storage devices from the client. Thus, a client must make a data request of a server in file name or other terms with the server mapping the request to one or more of its attached storage devices. Storage device interface protocols, such as device address, tracks, and sectors, are therefore not usually used between the client and server. In order to alleviate some of the overhead in the server, including reducing the cost in terms of the server's resources of memory, data paths, and transfer bandwidth, storage server systems seek a design in which storage data may be directly transferred between clients acting as requesting systems and the storage devices, rather than being transferred through a server system. While alleviating some of the overhead, a further benefit of the design is that storage capacity may be added without requiring an increase in the size of the server, thus providing greater storage scalability without a concomitant scaling of the server's resources.

While direct client system-storage device transfer may avoid scaling up of the transfer resources in servers, unfortunately, increased I/O communication overhead results. A client system must both communicate with a server and storage devices, and the server must have additional communications with clients and storage for each request to manage and protect its device and data resources. Scalability, therefore, is advantageous primarily where the amount of data transferred per request is large, such as in file transfer. Further, a design for scalability should allow for future direct network attachment of storage devices. Also, the "open" nature of the desirable client access requires that servers be able to manage and restrict access to storage devices by client systems, permitting only that access needed for each request. In addition, if transfer is to or from more than one storage device, the client must deal with data in parts in handling data transfer to or from the several storage devices for a single server request.

Lawrence Livermore National Labs (LLNL) provides an example of an attempt to achieve a scalable I/O system, i.e., to be able to have large amounts of storage/peripherals, DASDs (direct access storage devices) in particular, without requiring that servers have the processing, memory buffer, and data transfer rate capacity to pass all client-requested data through the server. For LLNL, a read-write with ticket (RWT) approach provides a general method for prevalidating requests from client systems to DASD and using digital signatures. Unfortunately, using digital signatures results in potential synonyms and increases complexity to DASDs by requiring validation of the signature. In general, robust digital signatures are long, thus requiring more device storage for validated pending requests. Further, RWT requires that data extent address information be returned to the client system, thus potentially allowing a successfully forged signature to be created and sent with a DASD command to a DASD device. LLNL RWT also requires explicit post-data transfer server communication to cancel the ticket in the DASD. In addition, RWT requires that the DASD a priori know the network address of the client system.

A need exists for a method and system for achieving a scalable input/output system that provides a "trusted" server to device control connection and protocol for the server to set up limited access transfer parameters for clients.

SUMMARY OF THE INVENTION

The present invention meets these needs provides a method and system for a scalable I/O system. The scalable I/O system includes a server, at least one client, and at least one storage device. The server interfaces with the at least one client and at least one storage device. The at least one storage device and at least one client also interface. The server initiates data transfer from the storage device on behalf of an open client (i.e., a client not closed within a fixed system or set of systems). The server further sets up a disconnect state in the at least one storage device to be reconnected for transfer to a non-server interface. The server further passes information to the open client that is requesting data transfer, which allows the open client to determine dimensions of data transfer, number of storage devices that require accessing for the data transfer, and the relationship of the data transfer of each storage device to the original request sent to the server.

Through the present invention, scalable growth of storage on a server or servers results without requiring comparable growth in server resources, e.g., memory for data buffers, data transfer bus bandwidth, etc. Further, access to the storages directly from clients via networks or conventional storage interfaces is achieved without requiring clients to a priori understand storage data locations or storage data address parameters. Additionally, the present invention provides security cost and performance effectiveness for storage devices and storage systems. Neither encryption nor Kerberos authentication is required, nor does it require that the storages act in "channel mode" as I/O or network communication initiators. Transfers are able to be accomplished with a minimum of inter-unit communication overhead, and storage device operations are able to begin earlier in a sequence, with access operations overlapped with some server-client communication. These and other advantages of the aspects of the present invention will be more fully understood in conjunction with the following detailed description and accompanying drawings.

DESCRIPTION OF THE INVENTION

The present invention relates to data transfer in and formation of a scalable I/O system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1A:
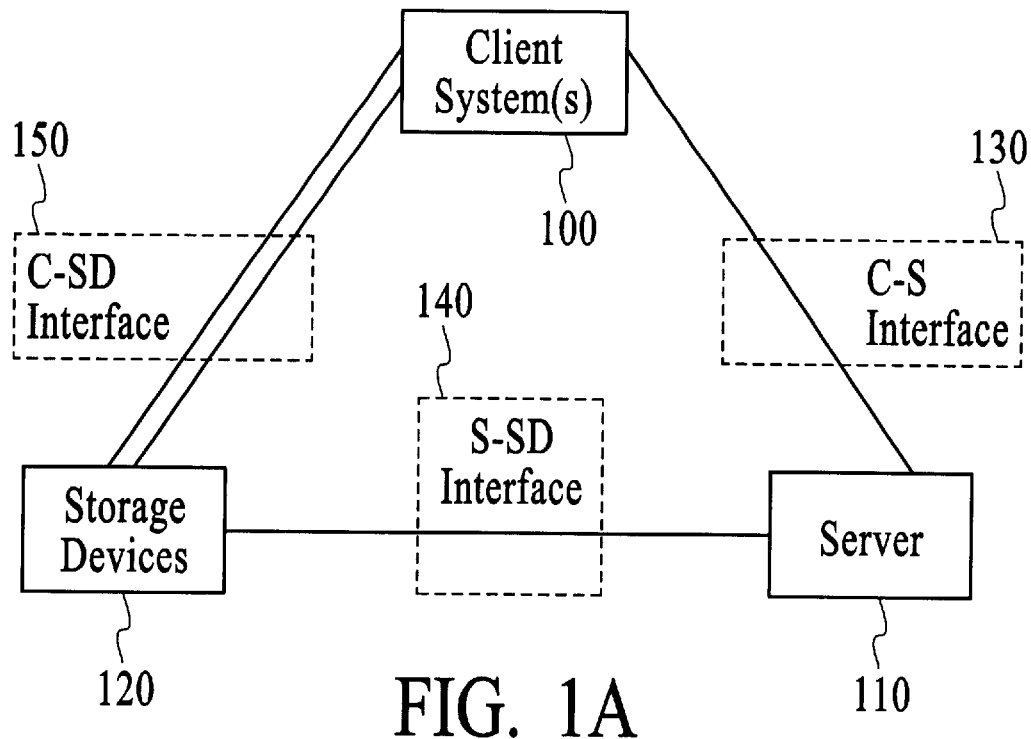
FIG. 1a illustrates a block diagram representation of a scalable I/O system in accordance with the present invention.

FIG. 1a illustrates a block diagram representation of an input/output (I/O) system environment for data access in accordance with the present invention. Included in the system are client system(s) 100, a server system 110, and storage device(s) 120. By way of example, personal computers, workstations, or mainframes are suitable components for use in the system as computer system 100 or server 110, while DASD or hard disks are suitable for storage device 120, as is well understood by those skilled in the art. Of course, these components are merely illustrative and not restrictive of the components capable for use as the I/O system. Thus, user-preferred types of devices may be used to achieve the aspects described herein without departing from the spirit and scope of the present invention. Through the present invention, three interfaces supporting client to storage device data transfer suitably result: a client-to-server (C-S) interface 130, a server-to-storage device (S-SD) interface 140, and a client-to-storage device (C-SD) interface 150.

The C-S interface 130 preferably facilitates communication using conventional client-server protocol modified for data to be returned via a different connection. The S-SD interface 140 facilitates connection both for control, i.e, the setting up of transfers for clients 100, and for data transfer loading and (backup) saving of storage device 120 data. Both the C-S and S-SD interfaces 130 and 140 are preferably modeled on conventional existing interface design, but extended in message content.

The C-SD interface 150 facilitates connection for data transfer using storage interface or network protocol and is a bandwidth-demanding transfer link, as indicated by the dual interface lines. Further, the C-SD interface 150 is suitably formed as a conventional DASD interface, such as SCSI, or as a network interface of any "carrier" type (such as TCP/IP) carrying DASD command protocol (e.g., SCSI) or other inter-unit command message and data transfer protocol, as desired. However, in accordance with the present invention, the SD interfaces (140 and 150) preferably include an additional storage device interface function of "reconnect for data transfer to alternate host/path under stimulus from that host/path", as described more fully hereinbelow with reference to FIG. 2.

Figure 1B:
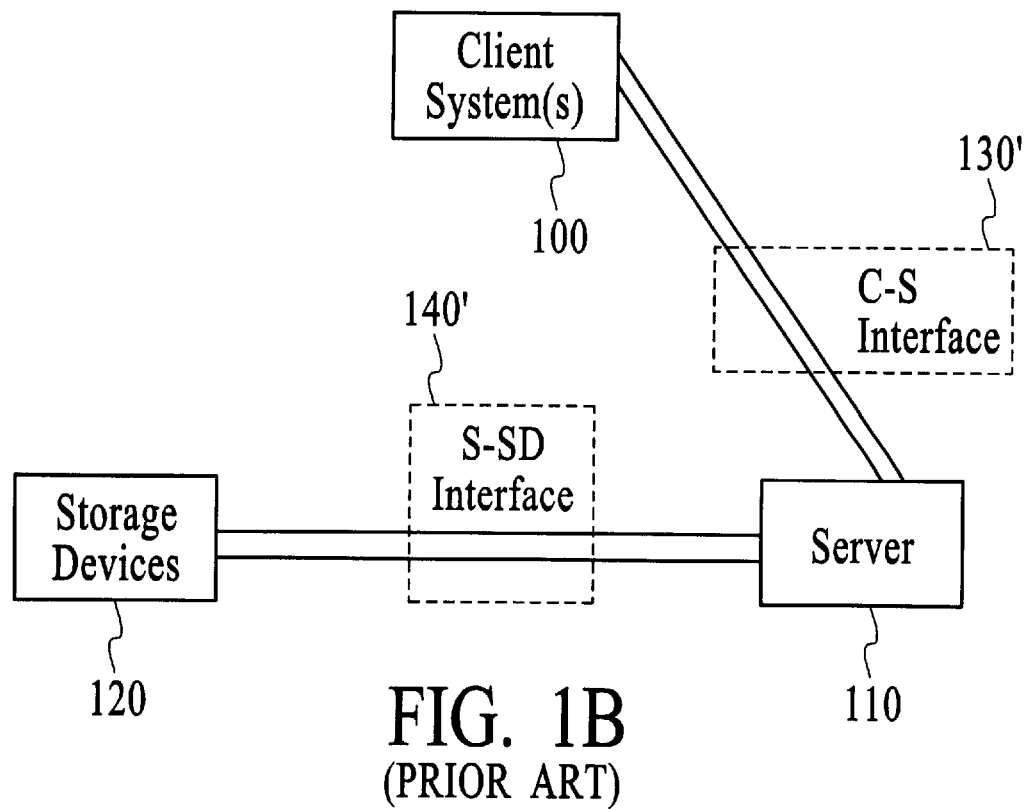
FIG. 1b illustrates a block diagram representation of an I/O system in accordance with the prior art.

For the purposes of the discussion regarding data transfer between clients 100 and storage devices 120, the operational scope of a server's operations extends securely to the storage devices 120 it manages, just as when the only connections from the storage devices 120 are to a server 110. By way of example, with reference to FIG. 1b, conventionally servers 110 interface with client systems 100 via an interface 130', and servers interface with storage devices 120 via an interface 140', but client systems 100 and storage devices 120 do not directly interface. Storage requests thus proceed from the client systems 100 to the server system 110, the server system 110 in turn interfacing with storage devices 120 to access storage data. Data is transferred between client systems 100 and server system 110, and between server system 110 and storage devices 120; but not between storage devices 120 and client systems 100—that being the advance offered by the present invention.

In the present invention, servers 110 must therefore be able to connect to and identify themselves to storage devices 120, with storage devices 120 only responding to non-servers when response has been set up in advance by a server 110. Thus, client systems 100 need not be within the operational and physical security control of the servers 110.

The requirement that storage devices 120 establish connection with a server 110 first is suitably realized by one of two well understood manners. One manner has connections outside the physically-controlled environment of servers 110 and their storage devices 120 physically restricted until the server-storage device connections have been established. Alternatively, configuration of the storage device 120 in its initialization (IML) following a physical reset or post power-on-reset provides acceptance of access only from a subset of interfaces, e.g., the S-SD interface 140, with a server 110 establishing a control session with each storage device 120. Using either method, after servers 110 have established control sessions with their storage devices 120, subsequent read and write transfers on other interfaces may occur only under advance setup via the server control session.

Figure 2:
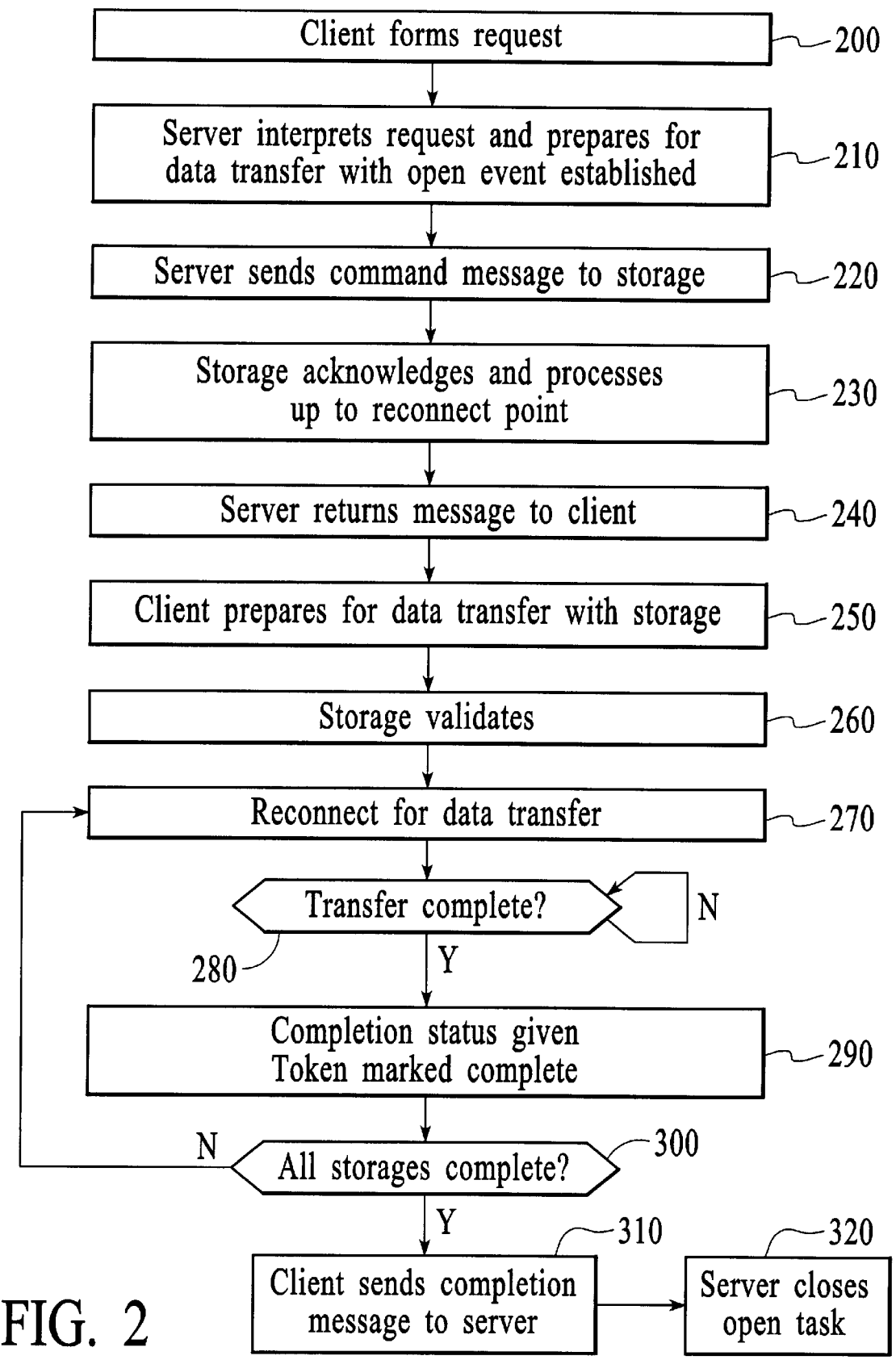
FIG. 2 illustrates a flow diagram of a method for achieving communication and data transfer in a scalable I/O system in accordance with the present invention.

Once a control session has been established with a storage device 120, the server 110 processes requests received from clients 100, as described with reference to the flow diagram of FIG. 2. To initiate data transfer, a process in a client system 100 sends a conventional server request to a server 110 in the logical form supported (e.g., network file system, NFS), which is intercepted by a storage device driver in the client system 100 (step 200). The client's driver is suitably utilized for the messages between client and server and to set up and manage client data transfer. Although described as a separate function to contain and minimize interface change in client systems 100, the client's driver is also suitably integrated into system function in client systems 100, as is well appreciated by those skilled in the art.

In forming the request, preferably the client's driver in the client system 100 forwards the request to the server 110 and tags the message to the server 110 with a unique-in-client-driver request identification (ID) token. In addition to the client request ID token, the client's driver may include the network address of the client system 100 in a form seen by storage devices 120 for later data transfer when later data transfer has been preconfigured.

The server 110 then interprets the request and prepares for data transfer with the establishment of an open event task (step 210). Preferably, the server 110 validates the request in a manner that would be used if the data were to be transferred between the storage devices 120 and the server 110, and the server 110 and the clients 100, as per present art protocol, determines which storage devices 120 need to participate in any data transfer, and establishes an open event task for the request. The server 110 then suitably sends a command message in an appropriate storage device protocol, for example, SCSI, via one of its established control links to each of the storage devices 120 that the client system 100 will employ for data transfer (step 220).

Preferably, the command message from the server 110 utilizes a message format in accordance with the interface protocol (e.g., SCSI) for a data transfer command with an additional "reconnect for data transfer to a different connection" indicator. The message suitably also contains the client request ID token, a server command ID token (event task ID or index from step 210), a sequence number and optional time stamp, and the network address of the client system 100 (if provided in step 200).

The storage device 120 then acknowledges the server 110 request and provides a unique storage device command identifier for this command (i.e., a command identifier different from and in addition to the server's command message ID) with processing of the command up to the point of reconnection for data transfer (step 230). Thus, preferably each storage device 120 constructs a reconnection token comprised of the client request ID, server command ID, sequence number, and server time stamp if used (from the data provided by the server in step 220), a server identifier (as established by server 110 when initialized) if the storage device 120 has room for this value, and the storage device's unique command ID. This reconnection token uniquely identifies the command and, via the command reference, the storage data to be transferred for the command. The reconnection token is preferably retained in each storage device 120 as a unique index to this command as long as the reconnection token is active.

The server then returns a message to the client's driver (step 240) that references the client request (driver request ID from step 200), identifies the storage device(s) 120 required for data transfer and provides other information for each data transfer storage device. The other information provided suitably includes: network or interface address(es) of the storage devices 120 for client data transfer; storage device command identifier (from step 230); server's command ID token, server sequence number (and time stamp, if used) that was given to the storage device 120 (in step 220); server identity as the server is known to the storage device; a data template that relates data on the storage device to the overall request; and any data transfer parameters that will be needed by the client (such as block sizes). Although this other information includes numerous items, suitably no storage device data addressability is returned to the client system 100, thus avoiding data security breaches by subsequent direct client to storage device transactions. Security is also ensured via the combination of token components retained in storage devices 120 and passed from server 110 to client 100, thence from client 100 to storage devices 120.

The client's driver then prepares the client's I/O subsystem for data transfer (step 250) as if it has issued read or write transfer requests in accordance with the terms of the data template and data transfer parameters, and then sends read or write reconnection command(s) to the storage device (s) 120. The reconnection command suitably includes the reconnection token defined in step 230 and returned by the server in step 240. This reconnection command may be sent using any appropriate storage interface protocol that the storage device 120 will support, e.g., packaged in network transport or as a native storage device command. Further, since the client's driver is provided with description templates to relate data transfer parameters to the original server request parameters, the client's driver is not required to know the location of or distribution of data storages.

The storage device 120 then validates that it has a pending command that requires data transfer and matches all the parameters in the reconnection command (step 260). Then, when ready, the storage device 120 reconnects to the client 100 for data transfer according to the protocol used (i.e., network or storage interface) (step 270). At the completion of successful data transfer, as determined by step 280, completion status is given to the client 100 for the reconnection command using the appropriate interface protocol, and the reconnection token is marked completed in the storage device 120 for discarding or logging, depending on storage device or subsystem design, (step 290). Suitably, a reconnection token marked complete is not valid for subsequent reconnection commands. Further, preferably, steps 260–290 are executed concurrently for each storage device 120 that participates in the data transfer for a client-server request.

Preferably, error reporting and recovery for data transfer is between the storage device and client's driver according to normal storage device actions for the interface protocol. A client may cancel a reconnect command, or the reconnect command may be terminated by the client or storage device due to unrecoverable errors. Suitably, the storage device reports such termination as command completion status to the server and mark that operation token complete.

When data transfer has completed for all the storage devices 120 involved in the data transfer, as determined via step 300, the client's driver suitably sends an operation completed message to the server 110 (step 310), referencing the request ID (i.e., sent in step 200) and the server's command ID and sequence number (sent in step 240). Further, the completed message identifies whether any storage device 120 has not successfully completed its transfer (e.g., permanent error or other exception).

Of course, alternatively each storage device 120 could report completion of its command to the server 110, but this is likely to have greater overhead and performance impact to both storage devices 120 and server 110 than a single "done" message from the client's driver that is processing the transfers. However, certain critical error messages, including unrecoverable loss of communications with a client, are suitably reported by the storage device 120 to the server 110.

The server 110 then closes its open task for the transfer request (step 320), and the server's event ID is no longer valid. Additionally, a server policy may establish a time bounds for client follow-up with storage devices on pending transfer commands. This could be a server default with a value set as a function of request size and complexity. After time expiration, or in response to other stimulus such as a cancel from client, a server may rescind an authorization for client transfer by cancelling its command via a message from the server to the storage devices.

Thus, with the present invention, storage device efficiently begin processing a data transfer request as soon as it is received from the server, up to the point where data transfer reconnection is required. Transfer then occurs between a client and storage device(s) directly. Limited communications overhead is needed, since there are few inter-nodal communication steps.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for achieving a scalable I/O system, the method comprising:

(a) forming a request for data transfer by a client to a server;

(b) initiating a connection from the server to at least one storage device, the at least one storage device being separate from the server, the connection being via a server interface in the at least one storage device;

(c) establishing via the server an ability to respond to the client via a non-server interface in the at least one storage device, the non-server interface being directly between the client and the storage device; and (d) performing data transfer with the storage device to the client via the non-server interface;

wherein the at least one storage device is a long-term storage device.

2. The method of claim 1 wherein step (a) further comprises intercepting the request in a server communication driver of the client;

forwarding the request from the server communication driver to the server; and tagging the request with a unique token.

3. The method of claim 2 wherein step (b) further comprises validating the request by the server;

identifying storage devices needed for data transfer; and establishing an event task for the request.

4. The method of claim 3 wherein step (b) further comprises sending a command message to each of the identified storage devices and providing an indicator of reconnection for data transfer to a non-server interface.

5. The method of claim 4 wherein step (c) further comprises acknowledging the request in each of the identified storage devices;

providing a storage device command identifier; and processing the request in the identified storage devices up to a point of reconnection for data transfer.

6. The method of claim 5 further comprising providing a message from the server to the server communication driver, wherein the message references the unique token, the identified storage devices, and a plurality of indicators.

7. The method of claim 6 wherein the plurality of indicators comprise:

an interface address of each identified storage device;

the storage device command identifier;

a server identification token and a server sequence number;

a server identity as server is known to identified storage devices;

a data template; and data transfer parameters.

8. The method of claim 7 wherein step (d) further comprises preparing the client for data transfer through the server communication driver; and sending a reconnection command to the identified storage devices.

9. The method of claim 8 wherein the reconnection command includes the storage device command identifier.

10. The method of claim 9 further comprising validating in the identified storage devices a pending command for data transfer and the reconnection command, and reconnecting to the client for data transfer.

11. The method of claim 10 further comprising providing a status of completion for the reconnect command in the client when the data transfer is done and marking the storage device command identifier completed in the storage device.

12. The method of claim 11 further comprising sending an operation complete message to the server by the server communication driver when all storage device transfer completed.

13. The method of claim 12 wherein the operation complete message references the unique token, server identification token, and server sequence number.

14. The method of claim 13 further comprising closing the event task by the server and removing validation of an event identifier in the server.

15. A scalable input/output system comprising:

at least one storage device for storing data;

at least one client system connected to the at least one storage device for data transfer; and a server, the server being separate from the at least one storage device, the server interfacing with the at least one storage device for setting up data transfer with the at least one client system, and interfacing with the at least one client system for modifying the client to the server communication to allow data to be returned from the at least one storage device to the at least one client system via a non-server interface in the at least one storage device, the non-server interface being directly between the client and the at least one storage device;

wherein the at least one storage device is a long-term storage device; and wherein the non-server interface in the at least one storage device is established via the server.

16. The system of claim 15 wherein the server further interfaces with the at least one storage device for data transfer loading and backup saving of data in the at least one storage device.

17. The system of claim 15 wherein the server further establishes an event task on behalf of the at least one client system.

18. The system of claim 15 wherein the server utilizes a command message of a chosen protocol extended in content with a reconnection command indicator when interfacing with the at least one storage device.

19. The system of claim 18 wherein the at least one storage device constructs a reconnection token to identify the command message.

20. The system of claim 19 wherein a client system requesting data transfer utilizes a reconnect command for connecting with the at least one storage device.

21. The system of claim 20 wherein the reconnection command includes the reconnection token.

22. The system of claim 20 wherein the at least one storage device marks the reconnection token complete when the data transfer is ended.

23. The system of claim 22 wherein a completed reconnection token is invalid for subsequent reconnection commands.

24. A method for achieving data transfer in a scalable input/output system, the method comprising the steps of:

interfacing one or more client system with a server;

interfacing the client system with one or more storage devices; and interfacing the server with the storage devices, the storage devices being separate from the server, the server initiating data transfer from the storage devices by establishing via the server an ability to respond to the client system via a non-server interface in the storage devices, the non-server interface being directly between the client and the storage device;

wherein the at least one storage device is a long-term storage device.

25. The method of claim 24 wherein interfacing the server with the storage devices further comprises setting up a disconnect state in the storage devices for reconnection and data transfer on a non-server interface.

26. The method of claim 25 wherein interfacing the one or more client systems with a server further comprises passing information to the client system to allow the client system to determine dimensions of data transfer.

27. The method of claim 26 wherein passing information further comprises identifying a number of storage devices requiring access for the data transfer, and providing a relationship of the data transfer from each storage device to the data request from the client system to the server.

* * * * *